United States Patent [19]
van den Berg

[11] 3,894,498
[45] July 15, 1975

[54] CULTIVATOR-SPREADER COMBINATION

[76] Inventor: Pieter van den Berg, 1109 Brookside Dr., Wilson, N.C. 27893

[22] Filed: Sept. 13, 1973

[21] Appl. No.: 397,109

Related U.S. Application Data

[62] Division of Ser. No. 157,467, June 28, 1971, Pat. No. 3,799,367.

[52] U.S. Cl. .................................. 111/6; 172/59
[51] Int. Cl. ............................................ A01c 23/02
[58] Field of Search ............. 111/6, 7; 172/59, 112; 222/485, 486, 176, 177

[56] References Cited
UNITED STATES PATENTS

| | | | |
|---|---|---|---|
| 2,584,484 | 2/1952 | McIntosh | 111/7 X |
| 2,835,420 | 5/1958 | Foley | 222/485 |
| 2,843,066 | 7/1958 | Dugan | 111/7 |
| 3,202,362 | 8/1965 | Wright | 222/176 X |
| 3,218,999 | 11/1965 | Pattison | 111/7 |
| 3,378,279 | 4/1968 | Jacobs | 111/7 |
| 3,413,940 | 12/1968 | Vissers | 111/7 |
| 3,608,645 | 9/1971 | Mvinors | 111/7 |
| 3,667,551 | 6/1972 | van der Lely et al | 172/59 |
| 3,742,877 | 7/1973 | Coffee | 111/6 |
| 3,810,434 | 5/1974 | van der Lely et al | 172/59 X |

Primary Examiner—Stanley H. Tollberg
Assistant Examiner—Norman L. Stack, Jr.
Attorney, Agent, or Firm—Mason, Mason & Albright

[57] ABSTRACT

An implement for introducing plant stimulants into the ground includes a container with a conduit and dispenser extending forwardly of the container. A cultivator connectable to a prime mover is located in front of the container and to the rear of a horizontal tube of the dispenser. The tube extends across the width of the cultivator and has a slotted opening facing to the rear to deposit material ahead of the cultivator. The opening is more or less exposed by a pivoted flap. The cultivator includes a plurality of tined soil-working members rotatable about upwardly extending axes so that the tines work overlapping strips of land.

9 Claims, 3 Drawing Figures

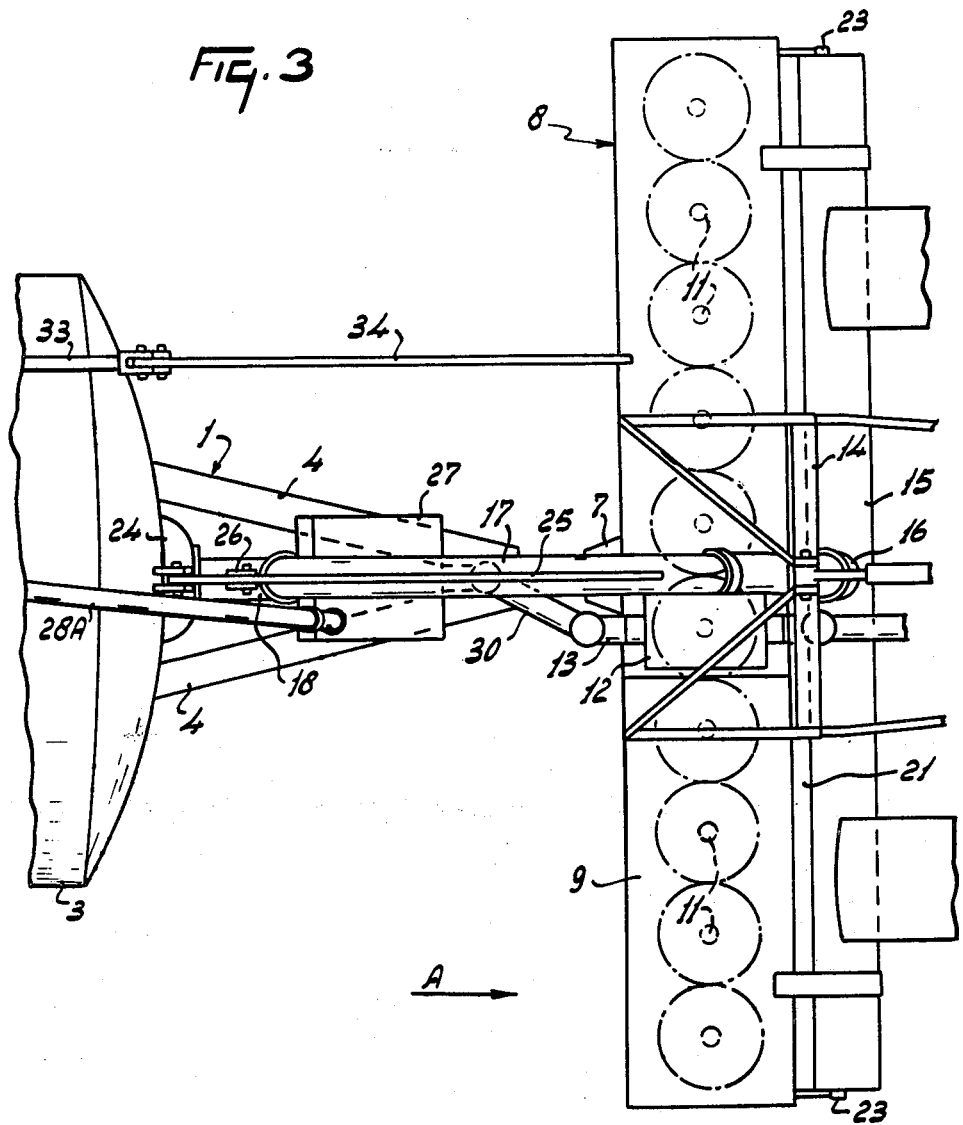

CULTIVATOR-SPREADER COMBINATION

This application is a division application of Ser. No. 157,467 filed June 28, 1971 now U.S. Pat. No. 3,799,367.

The invention relates to an implement for bringing plant growing stimulants into the ground which comprises a frame movable over the ground and at least one container mounted on said frame and dispensing means in communication with said container for supplying the material from said container.

In accordance with the invention there is provided a soil working means which comprises a cultivator having a plurality of rotatable soil working members which are located behind said dispensing means with respect to the direction of travel of the implement, said soil working members being arranged in a transverse row and being rotatable about upwardly extending axes whereby the tines of two neighbouring working members work overlapping strips of soil.

Figure 1:
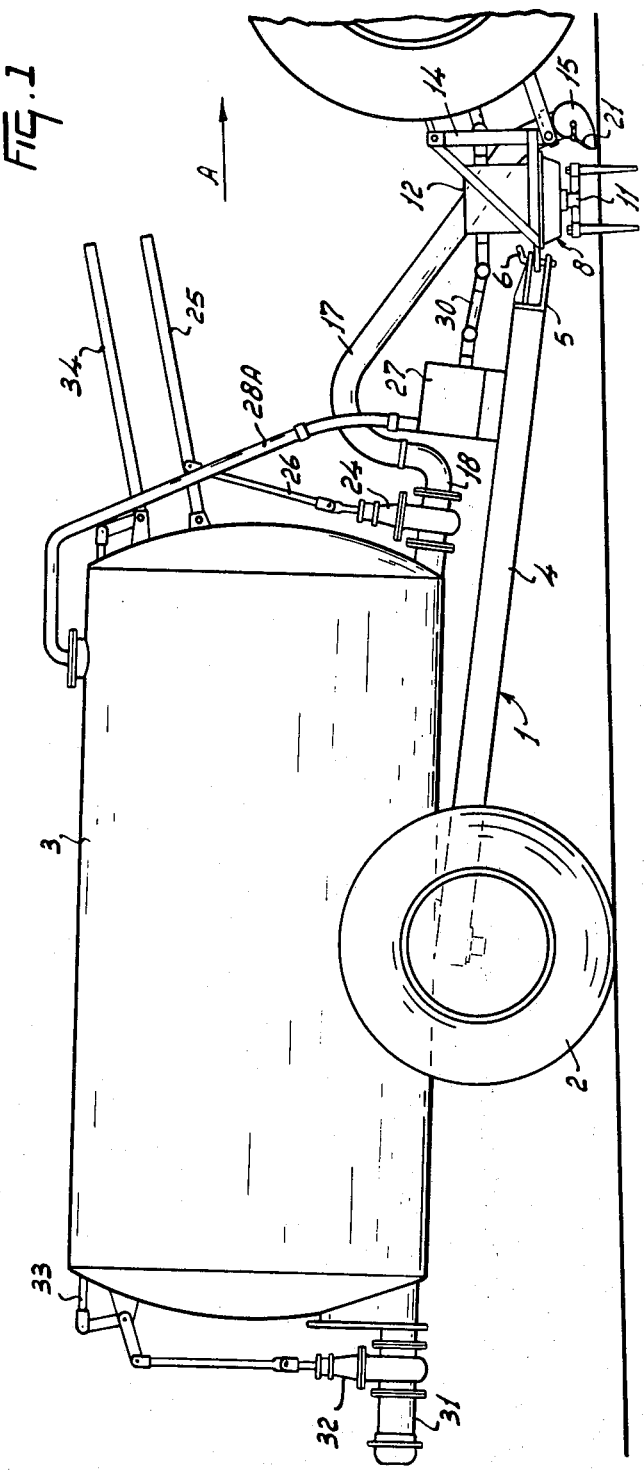
Figure 2:
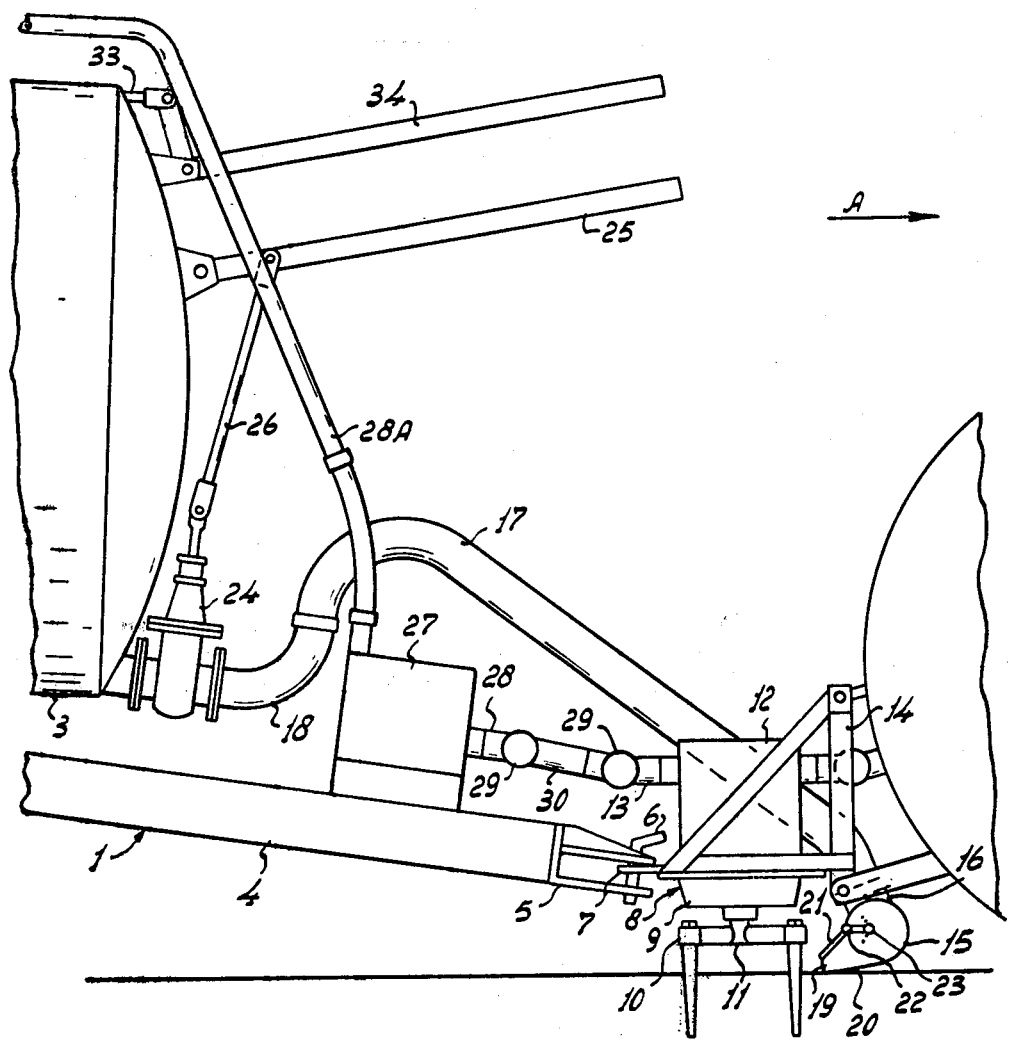

For a better understanding of the invention and to show how the same may be carried into effect, reference is made by way of example to the accompanying drawings in which:

FIG. 1 is a side view of a spreader according to the invention whereby the spreader is in its operative position, FIG. 2 is on an enlarged scale the forward part of the spreader shown in FIG. 1, FIG. 3 is a plan view of the spreader shown in FIG. 2.

The embodiments shown in the Figures relate to a manure spreader which comprises a frame 1 supported by ground wheels 2 on which a container 3 is mounted. The location of the supporting or ground wheels 2 is such that in side view these wheels lie substantially in the center of the container 3 which extends longitudinally in the direction of travel of the spreader and which, during operation, lies substantially horizontally, as is shown in FIG. 1. The frame 1 has, as seen in plan view (FIG. 3) mainly a triangular form whereby the upwardly extending sides 4 of the triangle extend in the direction of travel and form a draw bar. The draw bar is hingeably coupled at its forward end by means of a coupling piece 5 and a pin 6 to a tag 7 on the rear side of the frame of a cultivator 8. The frame of the cultivator 8 comprises a box-shaped transversely extending beam 9 in which a number of tined soil working members 10 is mounted, each of which is rotatable about a substantially vertical shaft 11. Each shaft 11 is provided, inside the box-shaped beam 9 with a corresponding spurtoothed pinion not shown. Hereby the teeth of neighbouring pinions are in mesh with each other. The uppermost end of one of the shafts of the center two soil working members 8 is extended upwardly beyond the beam 9 to carry a bevel pinion at its uppermost end. The bevel pinion which is not shown is located in a gear box 12 disposed near the center of the cultivator and which also contains a bevel pinion whose teeth are in driving mesh with those of the first-mentioned bevel pinion and which is mounted on a rotary shaft 13 which extends substantially parallel to the intended direction of travel of the spreader and which both at the front and the rear side of the gear box 12 emerges from the same. The front side of the box-shaped beam 9 is provided with a support 14 which can be coupled to the three point lifting hitch of a tractor and on its lower side carries a tube 15 which extends throughout the total working width of the cultivator in a transverse and substantially horizontal direction. The tube 15 is near its center provided with an inlet 16 which by means of a conduct 17 is connected to an outlet 18 of the container 3. The tube 15 is at its rear side provided with a slot 19 which extends throughout the whole length of the tube. The lowermost edge of the slot 19 comprises a strip 20 which extends obliquely downwardly and to the rear and, during operation, travels over the ground. The width of the slot 19 can be varied by means of an adjustable flap 21 which is turnable about a substantially horizontal axis 22 disposed on the rear side of the tube 15 by means of an adjusting mechanism 23 which lies on one end of the tube 15 by means of an adjusting mechanism 23 which lies on one end of the tube (see FIG. 2). The flap 21 can be brought into a number of positions for varying the width of the slot 19. The outlet 18 of the container 3 is provided with a closing valve 24 which can be actuated by means of a lever 25 which is pivotally connected to the front of the container 3 and further is pivotally coupled to a rod 26 which is pivotally connected to the upper side of an adjustable part of the valve. In front of the container 3 there is mounted on the frame 1 a pump 27 which by means of a conduit 28A is connected with the upperside of the container 3. The pump 27 has a driving shaft 28 which by means of universal joints 29 and a connecting shaft 30 is coupled to the rear end of the shaft 13 which emerges from the rear side of the gear box 12. At the rear of the container 3 there is provided an inlet 31 which includes a closing valve 32 which can be actuated from the front side of the container 3 by means of a rod system 33 which at the front side comprises a lever 34. During operation the support 14 on the cultivator 8 is coupled to the three-point linking hitch of a tractor whereas the driving shaft 13 at the front of the gear box 12 is coupled by means of universal joints and a connecting shaft to the p.t.o. of the tractor. By means of the pump 27 the container 3 can be filled from a manure pit or the like via the inlet 31.

During operation the spreader takes the position as shown in FIG. 1, whereby the implement is moved in the direction of the arrow A. The pump 27 which can be driven as stated above from the rear side of the gear box 12 of the cultivator 8, during operation, pressurizes the liquid in the container 3 which after opening of the valve 24 in the inlet 18 at the front side of the container through the conduct is brought into the longitudinal, transversely extending tube 15 which lies in front of the cultivator and moves by means of the strip 20 at the lower edge of the slot 19 over the ground. Through the slot 19 the liquid manure is spread onto the ground and by means of the rotating tined soil working members 10 of the cultivator 8 is brought under the surface of the ground. By means of the adjustable flap 21 the spreading of the manure onto the ground can be regulated.

After emptying the container 3 by means of the three point linking hitch the cultivator can be lifted out of the ground whereby the frame 1 carrying the container pivots about the axis of the ground supporting wheels 2 and can be supported.

With the afore-mentioned construction the means for bringing liquid manure under the surface of the ground which means is formed by the combination of the described cultivator 8 and the tube-like member 15 can be easily lifted out of the ground after which the implement can be transported and driven back to a pit or the like for refilling the container.

Having thus described my invention, what I claim as new and desire to secure by Letters Patent of the United States is:

1. An implement for introducing plant growing stimulants, such as thick-liquid substances, into the ground comprising a container supported on a wheeled frame movable over the ground, dispensing means in communication with said container and said dispensing means including an outlet means for dispensing material on the ground, a cultivator having a plurality of rotatable soil-working members being interconnected with said frame and said soil-working members being positioned in a row that extends transverse to the direction of travel to work a width of soil, said soil-working members having tines rotatably mounted on upwardly extending axes, said dispensing means extending across substantially the total working width of said cultivator and being located adjacent and in front of said soil-working members relative to the direction of normal travel.

2. An implement as claimed in claim 1, wherein said dispensing means includes a tube through which the material is spread onto the ground, said tube extending substantially parallel to said row of soil-working members throughout substantially the total working width of said cultivator.

3. An implement as claimed in claim 2, wherein said tube extends transversely and substantially horizontally relative to the direction of travel.

4. An implement as claimed in claim 2, wherein a conduct is connected to an outlet of said container and said conduct extends over said cultivator to communicate with said tube.

5. An implement as claimed in claim 2, wherein said tube has at least one slotted opening for spreading material onto the ground.

6. An implement as claimed in claim 5, wherein said slotted opening is located at the rear side of said tube with respect to the direction of travel.

7. An implement as claimed in claim 6, wherein said slotted opening extends substantially throughout the whole length of the lower portion of said tube.

8. An implement as claimed in claim 7, wherein a pivotable and adjustable flap is connected to said tube to more or less expose said opening whereby the outlet size of said opening can be regulated.

9. An implement as claimed in claim 1, wherein said cultivator has a support for connection to the rear of a prime mover and said frame is releasably coupled to the rear of said cultivator.

* * * * *